United States Patent
Chen et al.

(10) Patent No.: US 6,953,046 B2
(45) Date of Patent: Oct. 11, 2005

(54) MICROPROCESSOR-BASED GAS METER

(75) Inventors: Shiang-Fu Chen, Hsinchu (TW); Tzong-Sheng Lee, Hsinchu (TW); Chao-Wei Yeh, Hsinchu (TW); Chi-Fu Hung, Hsinchu (TW); Wen-Yang Chou, Hsinchu (TW); Hsiao-Lung Ning, Hsinchu (TW); Shih-Chi Kuo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 265 days.

(21) Appl. No.: 10/618,681

(22) Filed: Jul. 15, 2003

(65) Prior Publication Data

US 2004/0211462 A1 Oct. 28, 2004

(30) Foreign Application Priority Data

Apr. 25, 2003 (TW) ...................................... 92109751 A

(51) Int. Cl.⁷ .............................................. F16K 17/36
(52) U.S. Cl. ...................... 137/39; 73/263; 137/315.01
(58) Field of Search ...................... 127/38, 39, 315.01; 73/262, 263, 264

(56) References Cited

U.S. PATENT DOCUMENTS

| 4,565,090 | A | * | 1/1986 | Gotanda | 73/263 |
| 5,048,552 | A | * | 9/1991 | Bourne | 137/39 |
| 5,960,807 | A | * | 10/1999 | Reyman | 137/39 |
| 6,269,829 | B1 | * | 8/2001 | Chen et al. | 137/38 |

FOREIGN PATENT DOCUMENTS

| JP | 2000-9511 A | 1/2000 |
| JP | 2000-65620 A | 3/2000 |

* cited by examiner

*Primary Examiner*—Stephen M. Hepperle
(74) *Attorney, Agent, or Firm*—Birch, Stewart, Kolasch & Birch, LLP

(57) ABSTRACT

A microprocessor-based gas meter has fully electronic control, safety cutoff and data communication functions, while remains the same size of a conventional gas meter. The control circuit board in the microprocessor-based gas meter is mounted inside the main body of the gas meter through a mounting slot. The sensors, wires and battery are located in the rest space of the chamber so as to utilize the space of the chamber. When an abnormal situation is detected, the control circuit activates a cutoff valve and shuts off the gas intake. The data communication function is to transfer gas-metering data through telephone lines to the gas company so that the mistakes and cost of manual checking and recording can be eliminated.

20 Claims, 6 Drawing Sheets

MICROPROCESSOR-BASED GAS METER

BACKGROUND OF THE INVENTION

1. Field of the Invention

The invention generally relates to a gas meter, and in particular relates to a microprocessor-based gas meter having gas flow metering and safety shutoff mechanisms.

2. Related Art

Some places on the earth located near the seismic zones, such as Taiwan and Japan located on the circum-pacific seismic zone, suffer from frequent earthquakes than other places. Earthquakes not only damage building and hurt people, but also destroy facility lines, such as electric and gas supplies and cause secondary disasters.

To prevent gas leakage damages in earthquakes, Japan government acted to apply microprocessor-based gas meters from 1988. On Jan. 17, 1995, Hanshin-Awaji earthquake in Japan, with magnitude of 7.2, greatly damaged gas lines and gas facilities, caused gas leakage, fire and heavy casualties. Afterwards, Japan government actively introduces automatic gas shutoff devices in order to shut down gas lines and prevent gas leakage and fires during accidents of earthquake or other emergencies.

In the Energy Policy White Paper published by Ministry of Economic Affairs of R.O.C. in 1998, researches on microprocessor-based gas meter are suggested. Therefore, the Energy Commission and the Industrial Technology Research Institute started developments of microprocessor-based gas meter in 1999. On early morning of Sep. 21, 1999, Taiwan encountered a strong earthquake with magnitude of 7.3. The government therefore further pushes developments of automatic shutoff devices for gas facilities. The Bureau of Standards, Metrology and Inspection also plans to include inspection regulations to these kinds of devices for the sake of public and consumer's safety.

FIG. 1 shows a side view of a microprocessor-based gas meter disclosed by Japan Patent No. JP2000-9511. FIG. 2 is a top view of the gas meter. The microprocessor-based gas meter has an add-on control circuit module 20 mounted on top of a measuring chamber 10 of a conventional gas meter. The control circuit module 20 includes a cutoff valve 21 and a pressure detector 22. When an emergency occurs, the cutoff valve 21 will prevent the gas leakage.

However, the microprocessor-based gas meter separating the control circuit module 20 from the measuring chamber 10 increases the dimensions and tooling cost of the gas meter. Furthermore, the control circuit module 20 includes all the control elements on a single circuit board that is easy to generate heat and cause damage to the circuit.

Further, the microprocessor-based gas meter is not fully sealed that water or rain may get into the chamber. Because the control circuit module 20 is horizontally placed, it is easy to accumulate water on the circuit board and cause shortage of the circuit. Moreover, the control circuit module 20 is an additive member to a convention gas meter; it increases the total dimensions of the gas meter and does not better utilize the chamber space.

Then, Japan Patent No. JP2000-9511 discloses a microprocessor-based gas meter having means to overcome the drawbacks of water accumulation and circuit shortage of the horizontal circuit board on top of the measuring chamber. The microprocessor-based gas meter uses water resistive material, such as epoxy resin, silicon resin or the like, to cover the circuit board and prevent it from circuit shortage when water drops fall thereon.

However, in the microprocessor-based gas meter, the gas entering into four chambers in the lower portion first passes through a step motor that will increase resistance to the gas flow and influence the gas metering. Also, the microprocessor-based gas meter uses a solenoid to cut off the gas. Though the solenoid uses less electricity, the spring in the solenoid tends to change its elasticity after being used for a long time. It will fail to cut off the gas safely and reliably.

From an overview of the aforesaid conventional microprocessor-based gas meters, it is a common weak point that they use additive control modules on original gas meters. The add-on modules increase the dimensions of the whole units and do not fully utilize the interior spaces of the gas meters.

SUMMARY OF THE INVENTION

The object of the invention is to solve the aforesaid problems and provide a microprocessor-based gas meter having fully electronic control, safety cutoff and data communication functions, while remaining the same size of a conventional gas meter. In comparison with microprocessor-based gas meters of prior arts, the invention improves the space usage of the gas meter and prevents from circuit shortage caused by water drops on the circuit board.

A microprocessor-based gas meter of the invention includes functions of remote control, telemetry and safety alarm. The gas company can therefore get the metering data via telephone network. Home safety monitoring can also be attained.

The control circuit board in the microprocessor-based gas meter of the invention is mounted inside the main body of the gas meter through a mounting slot. The sensors, wires and battery are located in the rest space of the chamber so as to utilize the space of the chamber.

The microprocessor-based gas meter includes functions of automatic shutoff and data communication. When an abnormal situation is detected, the control circuit activates a cutoff valve and shuts off the gas intake. The data communication function is to transfer gas metering data through telephone lines to the gas company so that the mistakes and cost of manual checking and recording can be eliminated.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 1:
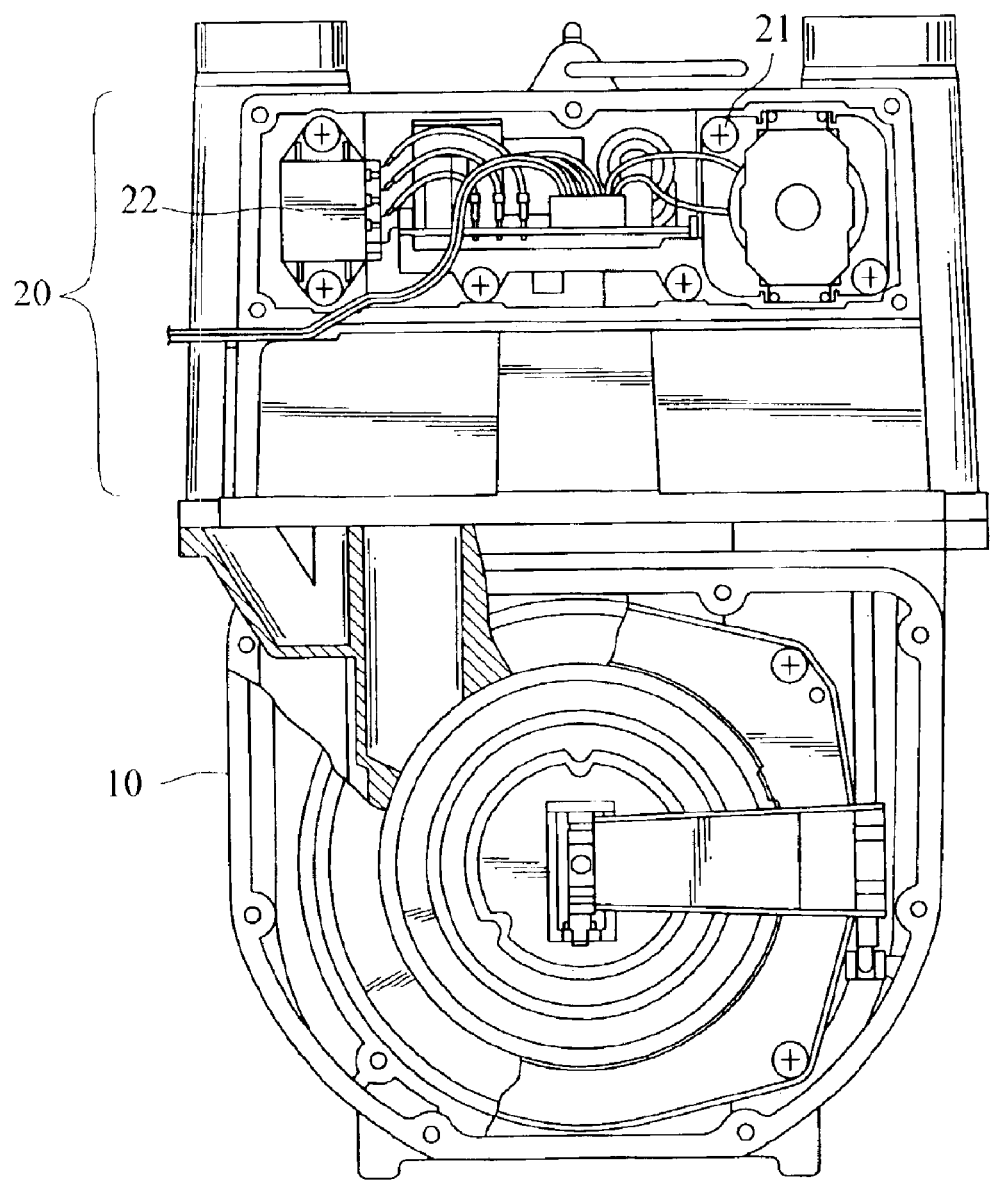
FIG. 1 and FIG. 2 are side view and top view of a microprocessor-based gas meter of prior arts and are described above.
Figure 2:
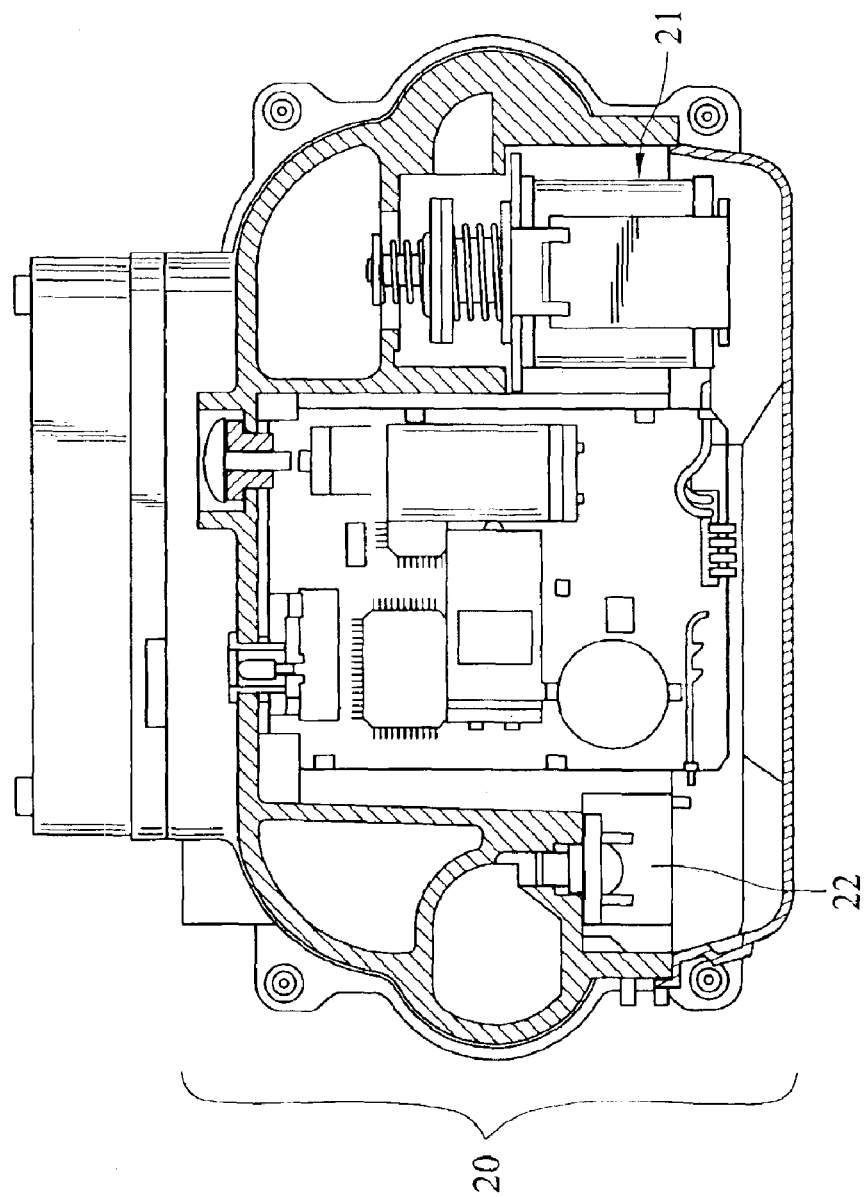
Figure 3:
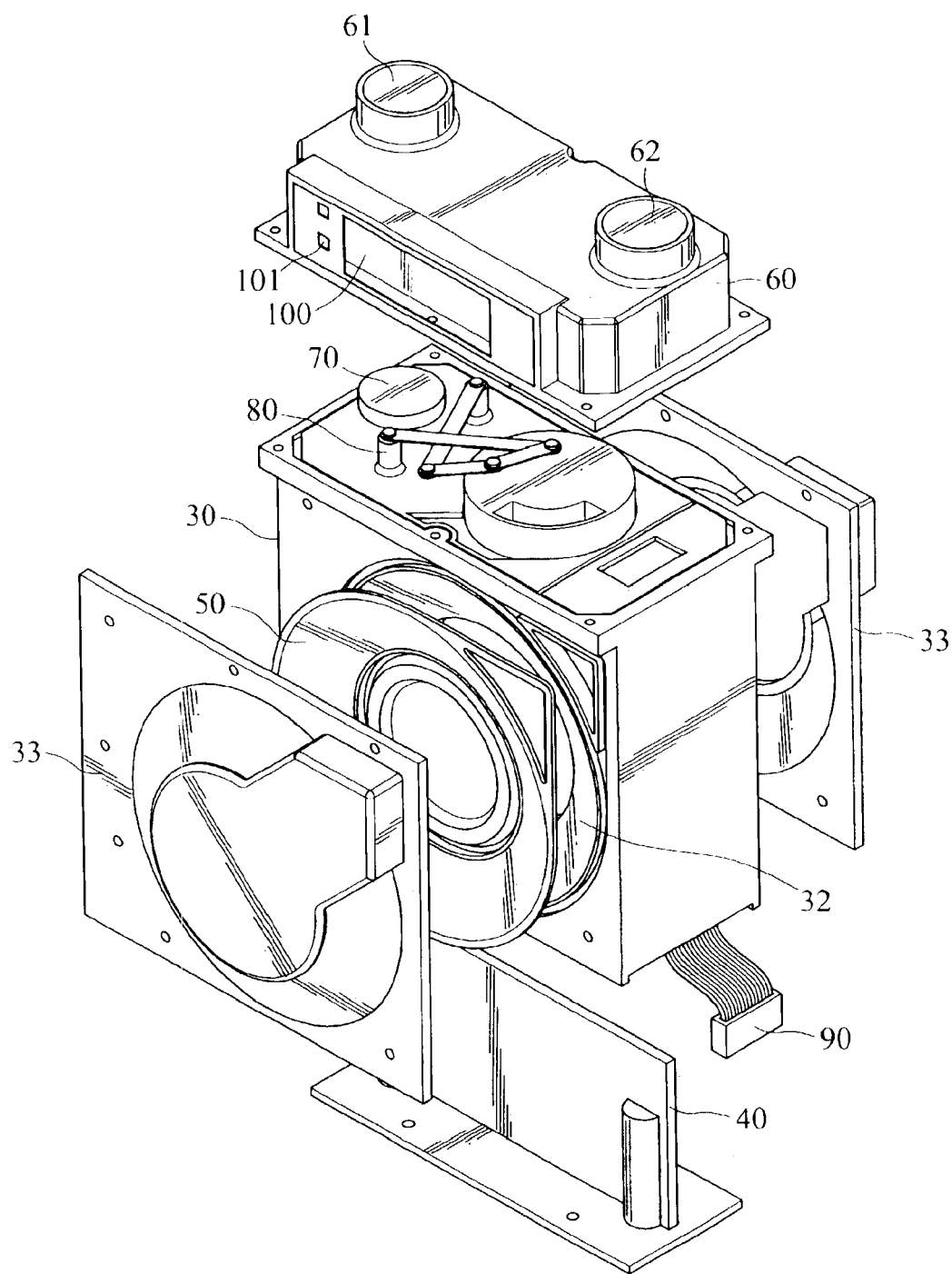
FIG. 3 is a constructional view of a microprocessor-based gas meter of the invention.

FIG. 3 is a constructional view of a microprocessor-based gas meter of the invention. The microprocessor-based gas meter mainly includes a main body 30, a control circuit board 40, diaphragms 50, a cover 60, a cutoff valve 70, a metering unit 80, a communication unit 90 and a power system (not shown in the drawing).

The control circuit board 40 is mounted inside the main body 30 and includes the control circuit of the whole meter system. By diaphragms 50 located outside the chambers 32 on both sides of the main body 30, the space for gas intake is divided into four chambers. The diaphragms 50 vibrate to provide smooth and stable gas output. The cover 60 is mounted on top of the main body 30 and includes a gas inlet 61 and a gas outlet 62 for intake and output of the gas.

The cutoff valve 70 is mounted under the gas inlet 61. When some sensors in the control circuit board 40 detect an abnormal situation, the cutoff valve 70 rises to close the gas inlet 61 and cuts off the gas intake. The metering unit 80 is a magnet adhered to the center portion of the diaphragm 50. Two reed switches in the control circuit board are correspondent to the magnets. When the diaphragms 50 vibrate and activate the reed switches, the gas metering is made by a flow metering logic unit in the control circuit board 40.

The communication unit 90 is a feature of the invention in comparison to conventional gas meter. The gas company can obtain gas-metering data from the communication unit 90 through telephone lines without the need of manual checking and recording. The electric power required for the computerized gad meter is provided by the power system.

Figure 4:
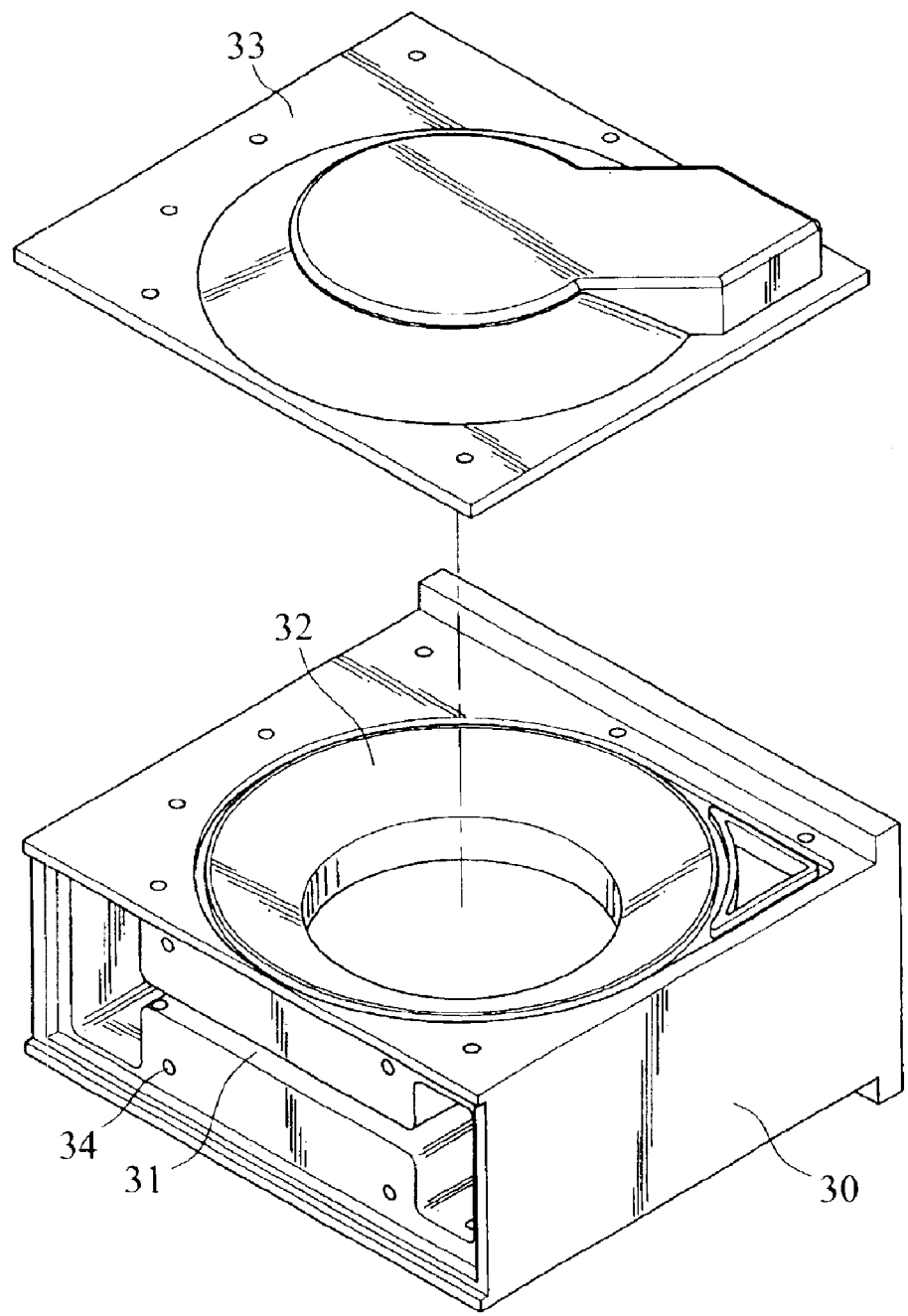
FIG. 4 is a bottom side perspective view of a main body in the microprocessor-based gas meter of the invention.

Please refer to FIG. 4, a bottom side perspective view of the main body 30. The bottom of the main body 30 includes a mounting slot 31 for mounting the control circuit board 40. When the control circuit board 40 fails, it can be easily removed from the mounting slot 31 for repair or replacement.

At the bottom of the main body 30, there are cone via holes 34 for air ventilation of interior of the main body and preventing water condensation on the control circuit board 40 that would cause circuit shortage. Meanwhile, the cone via holes can prevent insects from getting into the main body 30.

The mounting slot 31 in FIG. 4 is of H-shape. However, the sectional shape of the mounting slot can be of "I", "T" or others in order to better utilize the rest space in the main body 30 when mounting the control circuit board, sensors, power system and other components.

The control circuit board 40 includes circuits for controlling functions of the gas meter. For example, it includes circuits for gas flow metering, gas pressure detection and gas cutoff. The components for these functions are reed switches, a metering unit and a sensor assembly.

The reed switches and the metering unit are used to calculate the gas flow. The sensor assembly includes a plurality of pressure sensors for detecting the gas intake pressure, the gas output pressure and the gas pressure inside the gas meter.

Detecting the gas intake pressure where the gas getting into the gas meter is for checking the gas line outside the gas meter and preventing gas line leakage. The control circuit board 40 generates a warning signal to the user and sends a low-gas-pressure signal through the communication unit 90 to the gas company for calling inspection or repair. If the low-pressure condition remains for a certain time period, the control circuit board 40 automatically shuts off the gas inlet for safety.

When detecting the gas pressure at the gas intake suddenly decreasing or a small amount of gas continuing flowing for a long period, for example 36 hours, that is preset in the control circuit board 40, it indicates an abnormal condition (for example, someone committing a suicide), so the control circuit board 40 activates the safety shutoff mechanism to shut off the gas inlet.

The sensor assembly further includes a vibration sensor for sensing the acceleration of the gas meter when encountering a vibration such as by an earthquake. The acceleration refers to the magnitude of earthquake. Therefore, when the acceleration exceeds a predetermined value, the control circuit board 40 activates the safety shutoff mechanism, a cutoff valve 70 under the gas inlet 61 lifted to close the gas inlet so that gas is stopped from flowing out and a possible secondary disaster of fire can be prevented.

On both sides of the main body 30, there is a round chamber 32 respectively. The chambers 32 are parallel to the mounting slots 31 but not connected to each other. A diaphragm 50 is mounted beside each chamber 32 respectively. An outer cover 33 further covers the main body 30 so that the interior of the gas meter is divided into four chambers. By vibration of the diaphragms 50, gas is pressed out from the four chambers, and the gas output is smoothened and stabilized.

Figure 5:
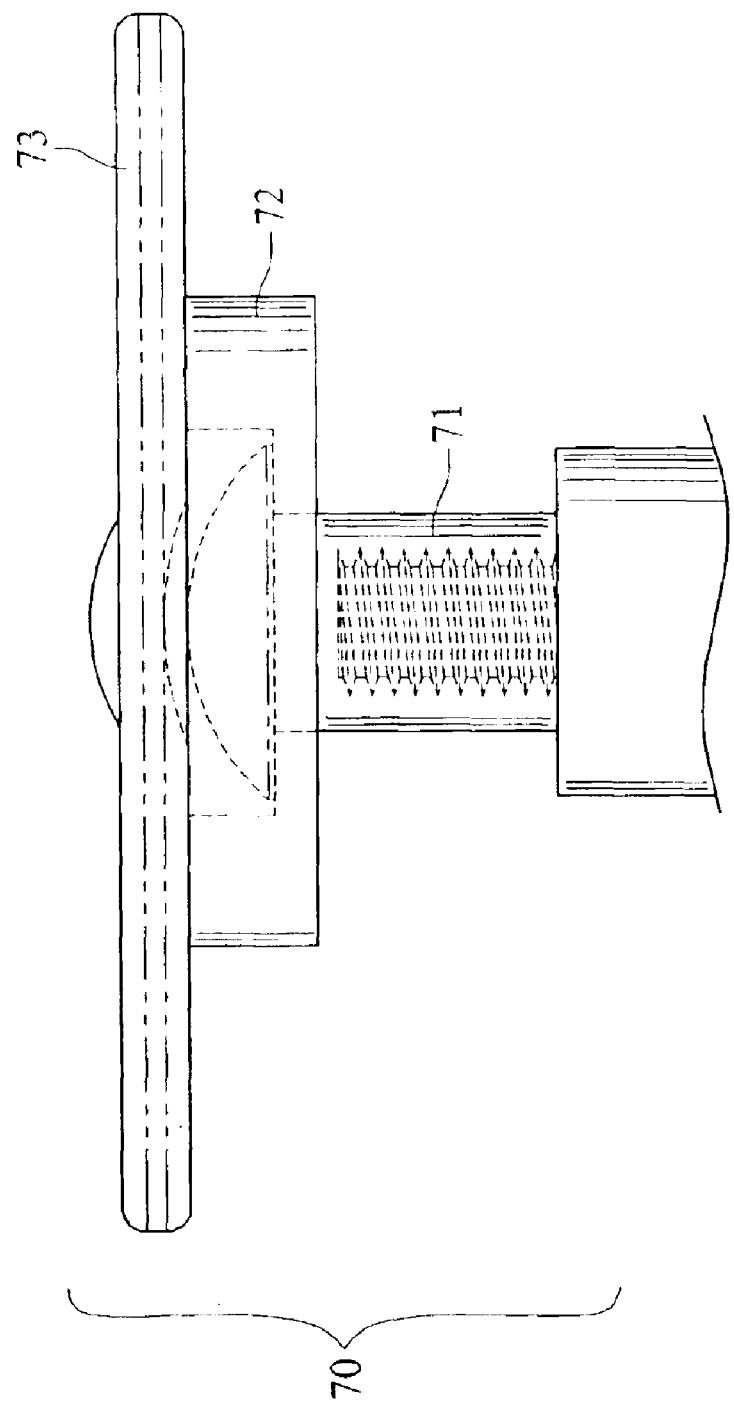
FIG. 5 is a sectional view of a cutoff valve in the microprocessor-based gas meter of the invention.

The cover 60 on top of the main body 30 includes a gas inlet 61 and a gas outlet 62 for gas flowing in and out of the gas meter. The cutoff valve 70 is a safety device for shutting off gas input when an emergency. The cutoff valve 70 is mounted under the gas inlet 61. As illustrated with a sectional view in FIG. 5, the cutoff valve 70 is composed of a step motor 71 and a spherical universal joint 72. In order to cut off the gas fully, the portion of the gas inlet 61 that contacts with the activated cutoff valve 70 is formed with a sharp edge.

When the vibration sensor detects an excessive acceleration, vibration; or the pressure sensor detects an abnormal pressure condition, the control circuit board 40 activates the automatic shutoff function. The step motor 71 lifts. The spherical universal joint 72 on top of the step motor 71 is flexible so as to fully close the gas inlet 61 through a gasket 73. The gas is therefore cut and sealed to prevent from leakage and danger.

Figure 6:
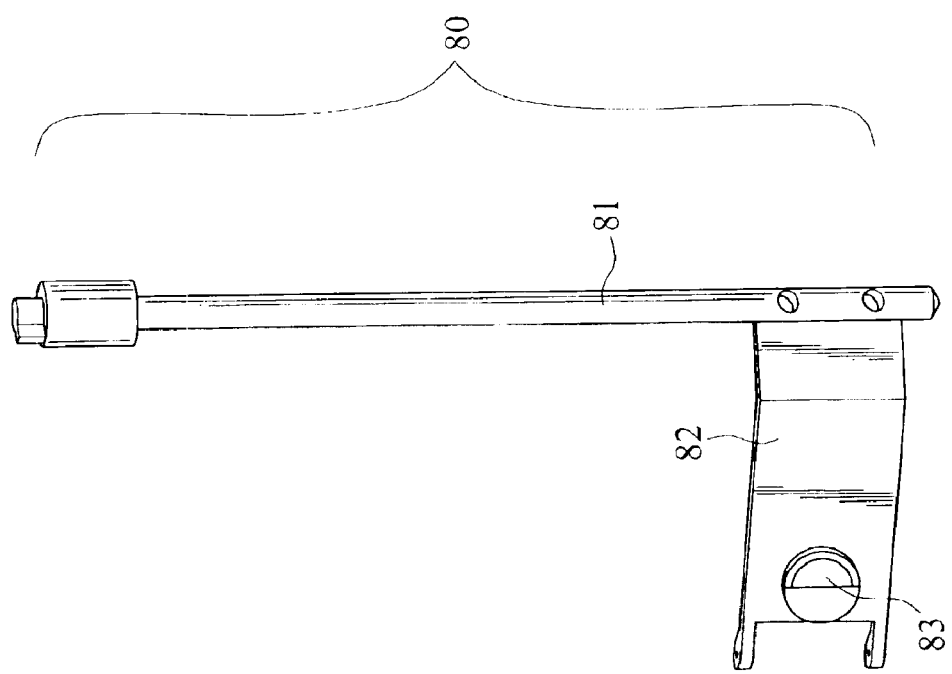
FIG. 6 is a side view of a metering unit in the microprocessor-based gas meter of the invention.

The gas flow is measured by the metering unit 80 in the gas meter. A side view of the metering unit 80 is shown in FIG. 6. It includes a rod 81 and a wing 82 connected on lower portion of the rod. The rod 81 is mounted near a diaphragm 50. The wing 82 includes a magnet 83 that is adhered to center portion of the diaphragm 50. The reed switch on the control circuit board 40 corresponds to the position of the magnet 83. When the diaphragm 50 vibrates as the gas flowing in and out, the movement of the magnet 83 actuates the reed switch, and a flow metering logic unit on the control circuit board counts the gas flow. Therefore, the movement of the diaphragm 50 activates pulse signals and enables the metering.

Currently, the gas company acquires gas-metering data by manual checking and recording. The manual process is very costly and easy to get mistakes. The microprocessor-based gas meter of the invention includes a communication unit 90 connected to the control circuit board 40. The communication unit 90 can collect gas-metering data and transfer the data through telephone lines to the gas company.

The gas company can periodically send a no-ring call to the client site. The communication unit 90 detects the ringing suppressed signal. Then, the control circuit board 40 reports metering data to the gas company. Though the no-ring call is made through the same telephone lines of the phone system, it uses a different carrier frequency, so the house telephone does not ring.

The communication unit 90 also includes a user-priority setting. When a no-ring call is calling, if a user is using the phone, the no-ring call is then stopped and resumed afterwards. Another embodiment of the communication unit 90 is that it reports the metering data from the control circuit board 40 through a computer network.

When the gas fee at the client site is not paid in time, the gas company can send a command to the gas meter through the communication unit 90 for cutting off the gas intake by operating the cutoff valve 70.

The microprocessor-based gas meter includes two batteries, one for the whole system; and the other for the step motor.

There is a display unit 100 mounted on the cover 60. The display unit 100 is a liquid crystal display or a light emitting diode module. A start button 101 is provided for user to press when he or she wants to know the current metering data. The start button 101 activates the data display. After a preset time period, the display automatically turns off for saving the power.

In order to optimize space usage of interior of the main body 30, one side of the H-shaped mounting slot 31 is used for wiring and mounting the step motor 71. The rest space on both sides is used for mounting the sensors and batteries. The arrangement makes a better space usage that all the components can be arranged in the original space of a convention gas meter.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A microprocessor-based gas meter for metering the flow rate of gas, comprising:
    a main body, having at least a chamber and a mounting slot substantially parallel to and separated from said chamber; a diaphragm mounted in said chamber for dividing said chamber into a plurality of chambers and capable of pushing gas out of said chambers; a control circuit board, mounted in said mounting slot, comprising at least a sensor assembly for sensing gas pressure;
    a cover, mounted on top of said main body and connecting to said chambers, having a gas inlet and a gas outlet for gas intake and gas output from said chambers;
    a cutoff valve, mounted under said gas inlet, for cutting off gas intake when said control circuit board detects an abnormal condition; and
    a metering unit, mounted in said main body, for metering gas flow from vibration of said diaphragm.

2. A microprocessor-based gas meter according to claim 1 wherein the cross-section of said mounting slot is of an H-shape.

3. A microprocessor-based gas meter according to claim 1 wherein the cross-section of said mounting slot is of a T-shape.

4. A microprocessor-based gas meter according to claim 1 wherein the cross-section of said mounting slot is of an I-shape.

5. A microprocessor-based gas meter according to claim 1 wherein said main body further comprises a plurality of cone via holes at the bottom thereof for air ventilation of interior of said main body.

6. A microprocessor-based gas meter according to claim 1 wherein said sensor assembly further comprises a vibration sensor for sensing the magnitude of vibration encountering.

7. A microprocessor-based gas meter according to claim 6 wherein said control circuit board activates said cutoff valve and cuts off gas intake when said vibration sensor detects a vibration magnitude exceeding a predetermined value.

8. A microprocessor-based gas meter according to claim 1 wherein said cutoff valve comprises a universal connector and a step motor; said step motor moves said universal connector to close said gas inlet when said control circuit board detects an abnormal condition.

9. A microprocessor-based gas meter according to claim 1 wherein said cutoff valve moves toward and seals said gas inlet when being activated.

10. A microprocessor-based gas meter according to claim 1 wherein said abnormal condition is that said sensor assembly detects a gas intake pressure higher than a predetermined value.

11. A microprocessor-based gas meter according to claim 1 wherein said abnormal condition is that said sensor assembly detects a gas pressure variation over a predetermined value instantly.

12. A microprocessor-based gas meter according to claim 1 wherein said abnormal condition is that said sensor assembly detects an unstable gas pressure.

13. A microprocessor-based gas meter according to claim 1 wherein said metering unit comprises:
    a rod, mounted on one side of said chamber;
    a wing, connected to a lower portion of said rod, having a magnet adhered to central portion of said diaphragm; and
    a reed switch and a flow metering logic unit, set in said control circuit board;
    therefore, when said diaphragm vibrates as gas flows, said magnet activates said reed switch and generates signals for said flow metering logic unit to meter the flow rate of gas.

14. A microprocessor-based gas meter according to claim 1 further comprises a communication unit connected to said control circuit board for transferring gas-metering data to a gas company.

15. A microprocessor-based gas meter according to claim 14 wherein said communication unit transfers gas-metering data through telephone lines.

16. A microprocessor-based gas meter according to claim 14 wherein said communication unit transfers gas-metering data through computer networks.

17. A microprocessor-based gas meter according to claim 14 wherein said communication unit transfers abnormal pressure information when said sensor assembly detects an abnormal gas pressure condition.

18. A microprocessor-based gas meter according to claim 1 further comprises a display unit for displaying gas metering data.

19. A microprocessor-based gas meter according to claim 18 wherein said display unit further comprises a start button for starting display of said gas metering data when being pressed.

20. A microprocessor-based gas meter according to claim 18 wherein said display unit comprises light emitting diodes.

* * * * *